US012606695B2

(12) United States Patent
Giannini et al.

(10) Patent No.: US 12,606,695 B2
(45) Date of Patent: Apr. 21, 2026

(54) HIGH-PERFORMANCE TYRE

(71) Applicant: Pirelli Tyre S.p.A., Milan (IT)

(72) Inventors: Luca Giannini, Milan (IT); Silvia Guerra, Milan (IT); Antonio Proto, Fisciano (IT); Carmine Capacchione, Fisciano (IT); David Hermann Lamparelli, Fisciano (IT); Veronica Paradiso, Fisciano (IT)

(73) Assignee: PIRELLI TYRE S.p.A., Milan (IT)

( * ) Notice: Subject to any disclaimer, the term of this patent is extended or adjusted under 35 U.S.C. 154(b) by 643 days.

(21) Appl. No.: 17/997,427

(22) PCT Filed: May 7, 2021

(86) PCT No.: PCT/IB2021/053888

§ 371 (c)(1),
(2) Date: Oct. 28, 2022

(87) PCT Pub. No.: WO2021/224874

PCT Pub. Date: Nov. 11, 2021

(65) Prior Publication Data

US 2023/0167283 A1 Jun. 1, 2023

(30) Foreign Application Priority Data

May 8, 2020 (IT) ........................ 102020000010330

(51) Int. Cl.
*C08L 9/08* (2006.01)
*B60C 1/00* (2006.01)
*C08F 36/06* (2006.01)

(52) U.S. Cl.
CPC .............. *C08L 9/08* (2013.01); *B60C 1/0016* (2013.01); *C08F 36/06* (2013.01); *C08L 2205/025* (2013.01); *C08L 2205/035* (2013.01); *C08L 2312/00* (2013.01); *C08L 2314/06* (2013.01)

(58) Field of Classification Search
None
See application file for complete search history.

(56) References Cited

U.S. PATENT DOCUMENTS

| | | | |
|---|---|---|---|
| 3,903,019 A | 9/1975 | Hargis et al. | |
| 4,112,210 A | 9/1978 | deZarauz | |
| 4,129,705 A | 12/1978 | de Zarauz | |
| 4,669,518 A | 6/1987 | Hargis et al. | |
| 4,933,401 A | 6/1990 | Hattori et al. | |
| 5,100,965 A | 3/1992 | Hsu et al. | |
| 5,317,062 A | 5/1994 | Rodgers et al. | |
| 5,753,579 A | 5/1998 | Jalics et al. | |
| 6,103,842 A | 8/2000 | Halasa et al. | |
| 6,429,245 B1 | 8/2002 | Francik et al. | |
| 6,581,659 B1 | 6/2003 | Zanzig et al. | |
| 6,627,715 B2 | 9/2003 | Halasa et al. | |
| 6,872,772 B2 | 3/2005 | Steiner et al. | |
| 6,889,737 B2 | 5/2005 | Weydert et al. | |
| 7,048,023 B2 | 5/2006 | Herberger, Sr. et al. | |
| 2004/0039104 A1 | 2/2004 | Bates et al. | |
| 2004/0177907 A1 | 9/2004 | Steiner et al. | |
| 2015/0057403 A1* | 2/2015 | Koda | C08F 236/06 524/496 |
| 2018/0044455 A1 | 2/2018 | Castellani et al. | |
| 2018/0215202 A1* | 8/2018 | Castellani | C08F 212/08 |

FOREIGN PATENT DOCUMENTS

| | | |
|---|---|---|
| EP | 1 593 528 A1 | 11/2005 |
| EP | 2 810 964 A1 | 12/2014 |
| EP | 3 081 593 A1 | 12/2014 |
| EP | 3 081 594 A1 | 12/2014 |
| EP | 3 081 613 A1 | 12/2014 |
| EP | 2 824 116 A1 | 1/2015 |
| EP | 2 643 367 B1 | 2/2015 |
| EP | 3 103 828 A1 | 12/2016 |
| EP | 3 168 062 A1 | 5/2017 |
| EP | 1231079 A1 | 8/2022 |
| WO | WO 2010/006655 A1 | 1/2010 |
| WO | WO 2016/170523 A1 | 10/2016 |

OTHER PUBLICATIONS

International Search Report form the European Patent Office in corresponding International Application No. PCT/IB2021/053888 mailed Aug. 25, 2021.

Written Opinion of the International Searching Authority from the European Patent Office in corresponding International Application No. PCT/IB2021/053888 mailed Aug. 25, 2021.

* cited by examiner

*Primary Examiner* — Christopher M Rodd
(74) *Attorney, Agent, or Firm* — Finnegan, Henderson, Farabow, Garrett & Dunner, L.L.P.

(57) ABSTRACT

The present invention relates to a tyre for vehicle wheels, in particular automobile wheels, characterised by a tread comprising at least one iso-styrene/trans-butadiene/terpene random terpolymer. Said tread is characterised by a greater tear resistance and a greater grip of the tyre to the roadbed.

14 Claims, 1 Drawing Sheet

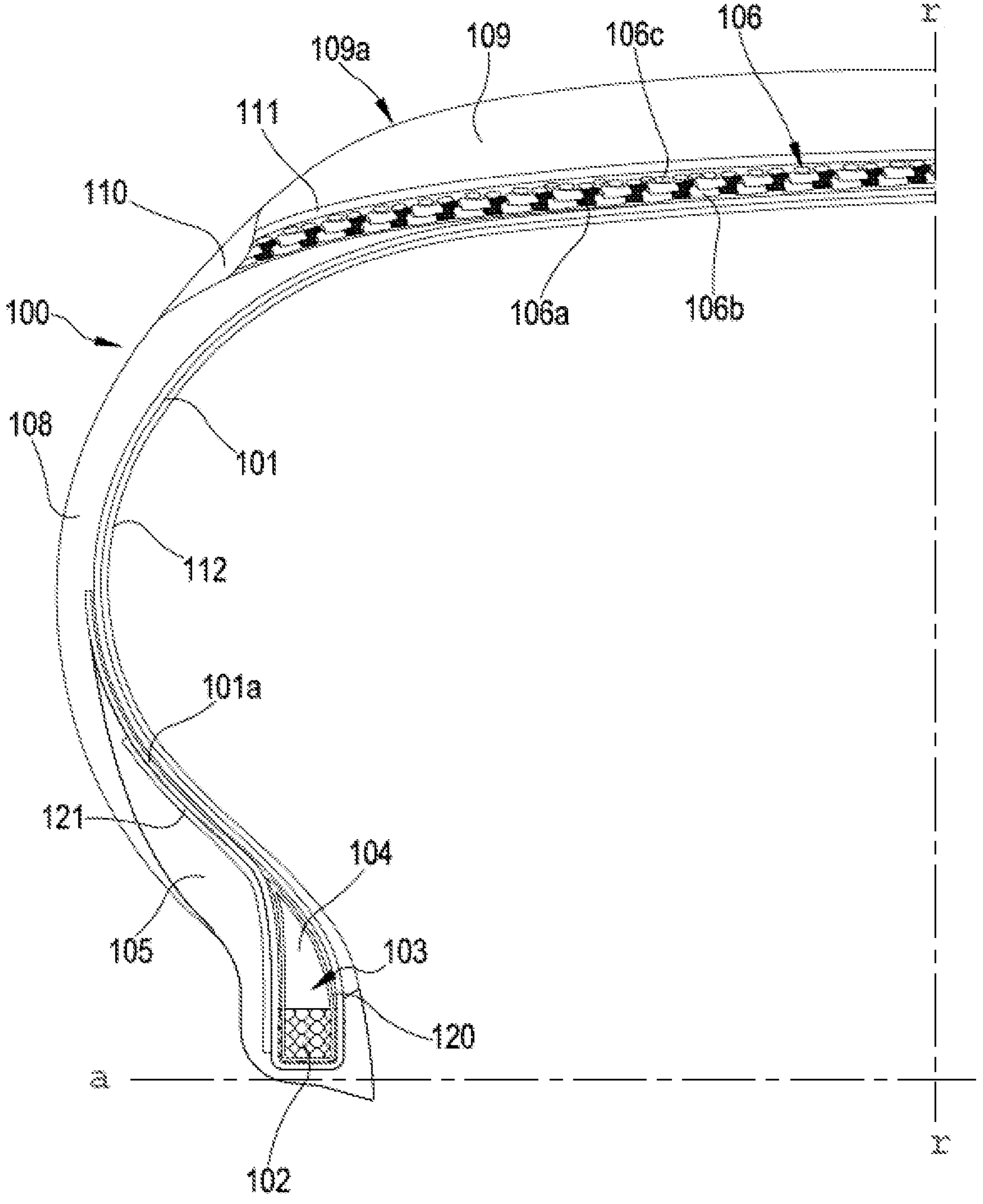
r
106
106c
109
109a
111
110
100
106a
106b
108
101
112
101a
121
104
105
103
120
a
102
r

HIGH-PERFORMANCE TYRE

This application is a national stage filing under 35 U.S.C. § 371 of International Application No. PCT/IB2021/053888, filed on Jun. 16, 2021, which claims the benefit of priority to Italian Application No. 102020000014512, filed on May 7, 2021 and Italian Application No. 102020000010330, filed May 8, 2020; the disclosure of each of these applications are each incorporated herein by reference in their entirety.

FIELD OF THE INVENTION

The present invention relates to a high-performance tyre for vehicle wheels, in particular automobiles and motor vehicles. In particular, the present invention relates to a high-performance tyre tread which comprises a cross-linked elastomeric material obtained by means of cross-linking a cross-linkable elastomeric composition comprising at least one iso-styrene/trans-butadiene/terpene random terpolymer.

PRIOR ART

Several catalysts and processes for producing polymers and copolymers are described in the documents U.S. Pat. Nos. 3,903,019, 4,112,210, 4,129,705, 4,933,401, 5,100,965, 5,753,579, 6,103,842 and 6,627,715.

The use of polymers and copolymers for producing at least one component of tyres is described in the documents U.S. Pat. Nos. 4,669,518, 5,317,062, 6,429,245, 6,581,659, 6,872,772, 6,889,737, 7,048,023, US2004/0039104, US2004/0177907, EP1593528, WO2010/006655 and EP2643367B1.

SUMMARY OF THE INVENTION

One of the objectives of the research in the field of tyres is that of increasing driving safety together with increasing overall performances.

In particular, the high-performance tyres, both in automobile and motorcycle fields, are designed for being used at high speeds and therefore they must allow high grip, especially on bends at high speed.

Said high-performance tyres for sports cars or motor vehicles, which are commonly termed "HP" and "UHP" ("High Performances" and "Ultra High Performances"), are in particular, but not exclusively, those having speed codes: "T", "U", "H", "V", "Z", "W", "Y" which correspond to maximum speeds of over 190 Km/h and up to over 300 Km/h, for which the operating performances at high temperatures are undoubtedly one of the most important factors.

Conventionally, the elastomeric compositions used for producing tread of high-performance tyres are based on styrene-butadiene copolymers (SBR) and are characterised by high glass transition temperature values (Tg) (i.e. higher than ~50° C.).

According to the experience of the Applicant, it is in fact deemed that a high Tg value allows a high grip of the tyre tread while, simultaneously, it confers limited abrasion resistance and high rolling resistance. On the other hand, a low Tg value provides high abrasion resistance and low rolling resistance while, however, the grip is limited.

Since it is not possible to obtain all the above-described characteristics by using only one elastomeric compound, in order to obtain tyre treads with optimal characteristics from all standpoints, in the prior art elastomeric compositions have been prepared which use mixtures of elastomeric polymers and/or copolymers with different chemical-physical characteristics.

Nevertheless, even when elastomeric compositions are obtained with a Tg value ranging from −90° C. to −40° C., it is not always possible to optimize the grip and duration characteristics.

In addition, the high-performance tyres are subjected, during use, to a considerable increase of the temperature, which can cause softness phenomena in the tread and negatively affect the grip. Consequently, another requirement consists of maintaining the mechanical properties and the performances constant even with the increase of the tyre temperature.

According to the experience of the Applicant, it is in fact deemed that the grip characteristics of the high-performance tyre tread, in particular in extreme driving conditions, at high speed and on a bend, are positively affected by the presence of high percentages of styrene in the elastomeric polymers and/or copolymers used for preparing the elastomeric compositions. Indeed, the use of polymers and/or copolymers with high styrene content allows increasing the hysteresis values of the finished tyre tread.

Nevertheless, the styrene-butadiene copolymers available on the market and used in the prior art for the formulation of the elastomeric compositions contain a maximum percentage of styrene equal to about 40% by weight.

The conventional techniques of polymerisation and catalysis do not allow obtaining styrene-butadiene copolymers with higher percentage of styrene monomers, since the presence of high percentages of styrene during the process of polymerisation promotes the formation of block copolymers, i.e. copolymers in which 10 or more consecutive units of styrene are present, which can have the typical Tg of polystyrene (+100° C.), and they are thermoplastic and hence unsuitable for producing tyre treads, since their mechanical properties and the abrasion resistance would be drastically compromised.

According to the experience of the Applicant, in order to modify the Tg of the compound, resins and/or polymers with low molecular weight can be added, for example with high styrene content.

The elastomeric compositions used for producing tyre treads typically comprise resins comprising styrene and/or other aromatic groups and/or polar groups (for example, α-methyl-styrene resins, styrene-indene resins, phenol resins, terpene resins and the like), characterised by a low molecular weight (MW), typically lower than 2,000 and by a high styrene content (and/or other aromatic and/or polar groups), for example, equal to at least 25% by weight, and preferably also up to 100% by weight. Due to their low molecular weight and high styrene content (and/or other aromatic group and/or polar group), they are employed for modulating the hysteresis of the tyre tread and, since they are entirely or partly solubilised in the elastomeric compositions, also the glass transition temperature (Tg) thereof is modulated.

However, the resins have the disadvantage of not cross-linking with the elastomeric polymers and/or copolymers that form the base elastomeric composition. One can therefore verify a tearing of the tyre tread, especially in the case of severe engagement, even after a non-prolonged use of the same.

As an alternative to or in association with the resins, one can add polymer materials with low molecular weight (MW) to the elastomeric compositions; typically such molecular weight is lower than 10,000.

The polymers with low MW have the advantage of being able to cross-link with the polymers and/or copolymers that form the base elastomeric composition, but on the other hand they do not considerably increase the hysteresis of the finished tyre tread since they do not have a styrene content as high as that of the resins. The possibility to cross-link is a function of the unsaturation percentage, of the nature of the unsaturation present in the polymer with low MW and above of the molecular weight: upon increasing the molecular weight, the possibility of co-cross-linking also increases, but at the same time also the hysteretic contribution decreases, given the same composition.

In the case of use of co-cross-linkable polymers with low molecular weight, the finished tyre tread will have an improved tear resistance but a reduced grip, if compared with tyre treads in which the resins are added.

In order to seek to simultaneously improve the properties of grip and of duration of the finished tyre tread, resins and polymers with low MW are often used together. However, the combination of these materials does not allow completely resolving the problem of tearing the tyre tread.

The Applicant has already provided a solution to the abovementioned problems in the patent EP2643367 B1 in which styrene-butadiene copolymers were described (in particular, with butadiene in trans conformation and styrene in isotactic configuration), having low molecular weight, in particular lower than 500,000, random distribution and content of styrene higher than 40% by weight. In EP2643367 B1 the Applicant in fact stated that the use of such copolymer in the elastomeric composition used in the production of a tyre tread ensured a high supply of styrene, it was capable of cross-linking with the base elastomeric composition and was solubilised therein.

The Applicant has thought to use other monomers for the preparation of copolymers with butadiene, and has tried several representatives of the terpene class, such as ocimene and myrcene. The results of such experimentation were not encouraging, however, since no advantage was encountered—rather, reduced mechanical strength was observed, in particular in the values of breaking load and elongation at break.

Continuing in the experimentation, the Applicant has tried to add a terpene, such as ocimene and myrcene, in the copolymerisation process described in EP2643367 B1, and has surprisingly found that the resulting terpolymer had static and dynamic mechanical properties that were further improved, in particular with higher values of breaking load, predictive of a higher tear resistance, and of elongation load, predictive of a lower softness of the tyre, and higher hysteresis values (modulus E' and tan δ) at all temperatures, predictive of a greater grip of the tyre on the roadbed.

The present invention therefore relates to a tyre for vehicle wheels comprising:

- a carcass structure, having opposite lateral edges associated with respective bead structures;
- optionally a belt structure applied in a radially external position with respect to said carcass structure;
- a tread band applied in a radially external position with respect to said carcass and/or belt structure;
- characterised in that said tread band comprises a cross-linked elastomeric material obtained by means of cross-linking a cross-linkable elastomeric composition, wherein said elastomeric composition comprises at least one iso-styrene/trans-butadiene/terpene random terpolymer, said iso-styrene/trans-butadiene/terpene random terpolymer having a styrene content ranging from 30% to 70% by weight with respect to the total weight of terpolymer, a terpene content ranging from 1% to 15% by weight with respect to the total weight of terpolymer and a content of 1,4-butadiene ranging from 30% to 70% by weight with respect to the total weight of terpolymer.

In the context of the present description, a terpolymer of styrene-butadiene-terpene with butadiene in trans conformation and styrene in isotactic configuration with random distribution is indicated with the term iso-styrene/trans-butadiene/terpene random terpolymer.

By trans conformation of butadiene, it is intended the geometric arrangement of the butadiene monomers in which the two single bonds of chain propagation are arranged on opposite sides with respect to the central double bond, as represented in the following structure formula.

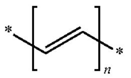

By isotactic configuration of the styrene, it is intended the isotactic arrangement of the styrene monomers, i.e. the arrangement in which the carbon atoms who carry the styrene groups have the same relative configuration and the styrene groups have the same spatial arrangement with respect to the plane, as represented in the following structure formula (i.e. the styrene groups are both arranged above or both arranged below the plane).

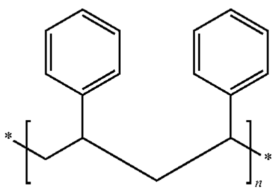

By random arrangement of the terpolymer, it is intended the random arrangement of the butadiene, styrene and terpene monomers in the polymer chain.

According to the invention, the iso-styrene/trans-butadiene/terpene random terpolymer has a styrene content ranging from 30% to 70% by weight with respect to the total weight of terpolymer. Preferably, the iso-styrene/trans-butadiene/terpene random terpolymer has a styrene content ranging from 40% to 60%, more preferably from 40% to 50% by weight with respect to the total weight of terpolymer.

According to the invention, the iso-styrene/trans-butadiene/terpene random terpolymer has a content of 1,4-butadiene ranging from 30% to 70% by weight with respect to the total weight of terpolymer. Preferably, the iso-styrene/trans-butadiene/terpene random terpolymer has a content of 1,4-butadiene ranging from 40% and 60%, more preferably from 50% to 60% by weight with respect to the total weight of terpolymer.

According to the invention, the iso-styrene/trans-butadiene/terpene random terpolymer has a terpene content ranging from 1% to 15% by weight with respect to the total weight of terpolymer. Preferably, the iso-styrene/trans-butadiene/terpene random terpolymer has a terpene content ranging from 5% and 15%, more preferably from 5% to 10% by weight with respect to the total weight of terpolymer.

Useful examples of terpenes which can be used for attaining the terpolymer of the present invention can be selected from among monoterpenes, sesquiterpenes, diterpenes, and triterpenes.

Advantageously, the iso-styrene/trans-butadiene/terpene random terpolymer contains a terpene selected from the group consisting of myrcene, ocimene, farnesene, geraniol, linalool, limonene, pinene, sabinene, terpinene, farnesol, and nerolidol.

More preferably, the iso-styrene/trans-butadiene/terpene random terpolymer contains a terpene selected from the group consisting of myrcene, ocimene and farnesene.

The terpenes such as myrcene, ocimene and farnesene contain a pair of conjugated double bonds and at least one isolated double bond. When the iso-styrene/trans-butadiene/terpene random terpolymer is attained with terpenes such as myrcene, ocimene and farnesene, the terpolymer mainly comprises such terpenes in vinyl conformation, i.e. polymerised by means of the terminal conjugated double, with lower quantities of such terpenes in trans conformation, i.e. polymerised by means of the two conjugated double bonds, in which the two single bonds of chain propagation are arranged on opposite sides with respect to the central double bond.

Preferably, the percentage of terpene in vinyl conformation represents more than 75% by weight, more preferably more than 85% by weight with respect to the total weight of terpene contained in the iso-styrene/trans-butadiene/terpene random terpolymer.

Preferably, the percentage of terpene in trans conformation represents less than 25% by weight, more preferably less than 15% by weight with respect to the total weight of terpene contained in the iso-styrene/trans-butadiene/terpene random terpolymer.

Preferably, the iso-styrene/trans-butadiene/terpene random terpolymer has a value of Tg (measured at the onset–onset Tg) ranging from −45 to +20° C.

Preferably, the iso-styrene/trans-butadiene/terpene random terpolymer has a molecular weight lower than 500,000, more preferably lower than 200,000 and, still more preferably ranging from 10,000 to 150,000.

Preferably, the iso-styrene/trans-butadiene/terpene random terpolymer molecular weight dispersion index ID is ranging from 1 to 5, more preferably ranging from 1.5 to 3.5. The dispersion index is calculated through the equation ID=Mw/Mn where Mw represents the mean ponderal molecular weight and Mn represents the mean numeric molecular weight.

Advantageously, the iso-styrene/trans-butadiene/terpene random terpolymer co-cross-links with the cross-linkable elastomeric composition during the vulcanisation process.

Preferably, the iso-styrene/trans-butadiene/terpene random terpolymer is present in the elastomeric composition in an amount ranging from 1 to 30 phr, preferably ranging from 5 to 20 phr, and more preferably ranging from 7 to 15 phr.

Advantageously, the terpolymer of the present invention can be obtained by solution copolymerisation, using a homogenous catalyst having general formula (I):

(I)

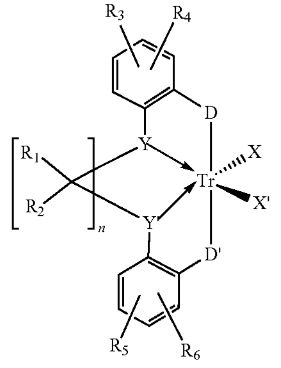

wherein Tr is a transition metal,

X and X', equal to or different from each other, are a halogen atom,

R1 and R2, equal to or different from each other, are a hydrogen atom or a linear or branched alkyl group having from 1 to 10 carbon atoms, R3 to R6, equal to or different from each other, are a hydrogen atom or a linear or branched alkyl group having from 1 to 10 carbon atoms, or a linear or branched aryl alkyl group having from 7 to 14 carbon atoms.

Y and Y', equal to or different from each other, are an atom of oxygen, sulphur, selenium, tellurium, or an NR7 or PR7 group, D and D', equal to or different from each other, are an atom of oxygen, sulphur, selenium, tellurium, or an NR7 or PR7 group, R7 is a hydrogen atom or a linear or branched alkyl group having from 1 to 10 carbon atoms, n is an integer from 1 to 10.

Tr is preferably a transition metal selected from among Ti, V, Cr, Mn, Fe, Co, Ni, Cu, Zr, Nb, Mo, Tc, Ru, Rh, Pd, Ce, Pr, Tb, Hf, Ta, W, Re, Os, Ir, Pt, more preferably between the elements of the third group, and still more preferably between titanium and zirconium.

Preferably, X and X', equal to or different from each other, are an atom of chlorine or bromine, a linear or branched alkyl aryl group or aryl alkyl group having from 1 to 10 carbon atoms in the alkyl part and from 6 to 14 carbon atoms in the aryl part, a linear or branched alkoxy group having from 1 to 10 carbon atoms. More preferably, X and X' are an atom of chlorine, a benzyl group or an isopropoxy group.

R1 and R2, equal to or different from each other, are preferably a hydrogen atom or linear or branched alkyl groups having from 1 to 6 carbon atoms, more preferably from 1 to 3 carbon atoms.

R3 to R6, equal to or different from each other, are preferably a hydrogen atom or a linear or branched alkyl group having from 1 to 6 carbon atoms, or a linear or branched aryl alkyl group having from 7 to 10 carbon atoms.

Preferably, Y and Y' are equal to each other and selected from between oxygen and sulphur. More preferably, Y and Y' are both sulphur.

Preferably, D and D' are equal to each other and selected from between oxygen and sulphur. More preferably, D and D' are both oxygen.

R7 is preferably a hydrogen atom or a linear or branched alkyl group having from 1 to 6 carbon atoms, more preferably from 1 to 3 carbon atoms.

n is preferably an integer from 1 to 5.

According to a preferred embodiment of the present invention, in the aforesaid formula (I), R4 and R6 are bonded to the benzene ring in ortho position with respect to the substituent D and D' and are represented by a linear or branched aryl alkyl group having from 7 to 14 carbon atoms, and R3 and R5 are bonded to the benzene ring in para position with respect to the substituent D and D' and are represented by a hydrogen atom or a linear or branched alkyl group having from 1 to 10 carbon atoms.

According to a more preferred embodiment of the present invention, the homogenous catalyst is represented by the following formula (1):

(1)

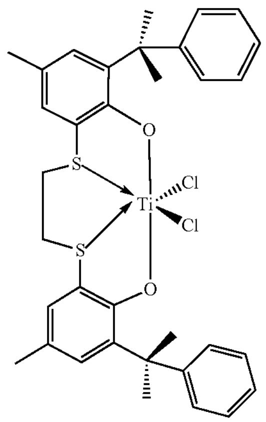

This catalyst has a high catalytic activity and provides a high polymer yield (see, for example, those described by (i) P. Longo et al., "Chemoselectivity in 4-methyl-1.3-pentadiene polymerization in the presence of homogeneous Ti-based catalysts" Macromol. Rapid Commun. 18, 183-190 (1997), (ii) C. Capacchione et al., Macromolecules, 2011, 44, 7940-7947, "Living, Isoselective Polymerization of 4-Methyl-1.3-pentadiene and Styrenic Monomers and Synthesis of Highly Stereoregular Block Copolymers via Sequential Monomer Addition", and (iii) A. Proto et al., Macromolecules, 2010, 43, 5919-5921, "Living, Isoselective Polymerization of Styrene and Formation of Stereoregular Block Copolymers via Sequential Monomer Addition").

The aforesaid catalyst can be used in a process at room temperature and at normal atmospheric pressure, with considerable advantages regarding costs and safety of the industrial process.

The copolymerisation process is carried out in a suitable solvent, preferably an aprotic solvent. Useful aprotic solvents are for example aliphatic hydrocarbons, such as pentane, hexane and cyclohexane, aromatic hydrocarbons, such as benzene, toluene, xylene and ethylbenzene, and halogenated hydrocarbons, such as dichloromethane. The preferred solvents are aromatic hydrocarbons, in particular toluene. Obviously, also mixtures of the aforesaid solvents can be used.

The starting concentration of each comonomer added is generally set to a value ranging from 0.001 to 10 moles per litre, preferably from 0.01 to 8 moles per litre. The reaction temperature can be comprised in a rather wide interval depending on the solvent used. The reaction temperature is usually ranging from 0° to 100° C., and in particular preferably from 10° to 40° C. Preferably, the copolymerisation process is executed at room temperature. The reaction is conducted for a time period ranging from 15 minutes to 75 hours, preferably from 30 minutes to 30 hours. The reaction can be carried out at pressures ranging from 0.1 to 10 atmospheres. The reaction is usually carried out at pressures ranging from 0.5 to 5 atmospheres. Preferably, the copolymerisation process is carried out at atmospheric pressure.

The copolymerisation process is preferably carried out in controlled reaction conditions, i.e. with the exclusion of oxygen and humidity. If desired, an inert gas such as argon or nitrogen can be used. The polymerisation reaction starts with the addition of the catalyst to the solution of the monomers. The catalyst can be added as is or in solution. In particular, the catalyst is dissolved in a suitable solvent, and then added to the solution of the monomers in the same solvent.

The copolymerisation process preferably comprises the use of an activator, such as for example aluminoxanes and aluminium-alkyls, as is known in the art. Examples of suitable aluminoxane compounds include methylaluminoxane (MAO), polymer MAO (PMAO), modified MAO (MMAO), ethyl aluminoxane, diisobutyl aluminoxane, and the like. Examples of suitable alkyl aluminium compounds include triethylaluminium, diethyl aluminium chloride, trimethylaluminium, and triisobutyl aluminium. The copolymerisation process is interrupted by means of the addition of a protic compound, for example an alcohol with low molecular weight, such as methanol, ethanol, and isopropanol, or by means of removal of the solvent.

The terpolymer formed is generally solid, and it can be recovered by organic solvents by means of conventional techniques, such as settling, filtration, centrifugation and so forth. The terpolymer can thus be purified by means of conventional technique, such as washing or extraction with vapor, in order to remove the impurities, typically represented by volatile organic compounds.

In a preferred embodiment, the cross-linkable elastomeric composition comprises at least one elastomeric polymer with high molecular weight, preferably a diene elastomeric polymer, of natural or synthetic origin.

Preferably said elastomeric polymer is present in an amount of 100 phr. For the object of the present description and the following claims, the term "phr" indicates the parts by weight of a certain component of the cross-linkable elastomeric composition for 100 parts by weight of the elastomeric polymer.

Preferably, said diene elastomeric polymer is selected from the group which comprises: cis-1,4-polyisoprene (natural or synthetic, preferably natural rubber), 3.4-polyisoprene, polybutadiene (in particular, polybutadiene with a high 1,4-cis content), isoprene/isobutene copolymers, optionally halogenated, 1.3-butadiene/acrylonitrile copolymers, styrene/1.3-butadiene copolymers, styrene/isoprene/1.3-butadiene copolymers, styrene/1.3-butadiene/acrylonitrile copolymers, or mixtures thereof.

The diene elastomeric polymers described above can be optionally functionalised with suitable termination or coupling agents.

Advantageously, the cross-linkable elastomeric composition typically also comprises at least one reinforcing filler which can be selected from among those commonly used for cross-linked manufactured products, in particular for the tyres, such as for example: carbon black, silica and silicates, alumina, calcium carbonate, or mixtures thereof. Carbon black, silica and mixtures thereof are particularly preferred.

Preferably, said reinforcing filler can be present in the cross-linkable elastomeric composition in a quantity generally lower than 130 phr, preferably from 40 phr to 100 phr.

According to a preferred embodiment, said carbon black reinforcing filler can be selected from among those having a surface area not smaller than 20 $m^2/g$ (determined by STSA—statistical thickness method—according to ISO 18852:2005).

According to a preferred embodiment, said silica reinforcing filler can for example be precipitated silica.

The silica reinforcing fillers, which can be advantageously used according to the present invention, preferably have a BET surface area from about 30 $m^2/g$ to 400 $m^2/g$, more preferably from about 100 $m^2/g$ to about 250 $m^2/g$, still more preferably from about 120 $m^2/g$ to about 220 $m^2/g$. The pH of said silica reinforcing filler is, generally, from about 5.5 to about 7, preferably from about 5.5 to about 6.8.

Examples of silica reinforcing fillers that can be used according to the present invention and are available on the market are the products known with the names of Hi-Sil® 190, Hi-Sil® 210, Hi-Sil® 233, Hi-Sil® 243, available from PPG Industries (Pittsburgh, Pa.); or the products known with the names of Ultrasil® VN2, Ultrasil® VN3, Ultrasil® 7000 by Evonik; or the products known with the names of Zeosil® 1165MP and 1115MP by Solvay.

Advantageously, the elastomeric composition comprises at least one silane coupling agent capable of interacting with the reinforcing filler and bonding it to the elastomeric polymer during vulcanisation.

The coupling agents that are preferably used are those based on silane, which can be identified for example by the following structural formula (VI):

$$(R_2)_3Si—C_tH_{2t}—X \quad (VI)$$

in which the $R_2$ groups, which can be equal to or different from each other, are selected from among: alkyl, alkoxy or aryloxy groups, or halogen atoms, with the condition that at least one of the $R_2$ groups is an alkoxy or aryloxy group; t is an integer between 1 and 6 (and including 1 and 6); X is a group selected from among nitrous, mercapto, amino, epoxide, vinyl, imide, chlorine, $—(S)_uC_tH_{2t}—Si—(R_2)_3$ or $—S—COR_2$, in which u and t are integers from 1 to 6, 1 and 6 included, and the R2 groups are defined as reported above.

Coupling agents which are particularly preferred are: bis(3-triethoxysilylpropyl) tetrasulphide and bis(3-triethoxysilylpropyl) disulphide. Said coupling agents can be used as is or in a suitable mixture with an insert filler (for example carbon black) so as to facilitate their incorporation in the cross-linkable elastomeric composition.

Preferably, the coupling agent is added to the cross-linkable elastomeric composition in an amount ranging from 1 to 20% by weight, more preferably from 5 to 15% by weight, and still more preferably from 8 to 12% by weight with respect to the weight of silica.

The cross-linkable elastomeric composition mentioned above can be vulcanised according to the known techniques, in particular with sulphur-based vulcanisation systems, commonly used for the elastomeric polymers. For such purpose, in the composition, after one or more thermo-mechanical processing steps, a sulphur-based vulcanisation agent is incorporated together with the vulcanisation accelerants. In the final processing step, the temperature is generally maintained below 120° C. and preferably below 100° C., so as to prevent any undesired pre-cross-linking phenomenon.

The vulcanisation agent used is, in a more advantageous manner, sulphur or molecules containing sulphur (sulphur donors), with vulcanisation activants, accelerants and retardants, which are known to the men skilled in the art.

Activants which are particularly effective are the zinc compounds, and in particular ZnO, zinc salts of saturated or unsaturated fatty acids, such as for example zinc stearate, which are preferably formed on-site in the elastomeric composition starting from ZnO and fatty acids. Useful activants can also be inorganic salts or oxides of Fe, Cu, Sn, Mo and Ni as described in the patent application EP 1231079. Stearic acid is typically used as activant with zinc oxide.

Said vulcanisation activants are preferably employed in the cross-linkable elastomeric composition in a quantity from about 0.5 phr to about 10 phr, more preferably from 1 phr to 5 phr. Accelerants which are commonly used can be selected from among: dithiocarbamates, guanidines, thiourea, thiazoles, sulphenamides, thiourams, amines, xanthates, or mixtures thereof.

The vulcanisation retardants which are commonly used can be selected from among, for example: urea, N-cyclohexyl-2-benzothiazolyl sulphenamide, N-cyclohexylphthalimide, N-cyclohexylthiophthalimide, N-Nitrosodiphenylamine or mixtures thereof.

Said vulcanisation retardants are possibly employed in the cross-linkable elastomeric composition in a quantity lower than 1 phr, more preferably lower than 0.5 phr and, still more preferably, from about 0.1 phr to about 0.3 phr.

The cross-linkable elastomeric composition can comprise other additives commonly used based on the specific application for which the composition will be used. For example, the following can be added to the elastomeric composition: antioxidant, anti-aging agents, plasticising agents, adhesives, antiozonants (in particular of p-phenylenediamine type), waxes, modified resins, fibres (for example Kevlar® paste), or mixtures thereof.

The cross-linkable elastomeric composition mentioned above can be prepared by mixing the base elastomeric components together with the other optionally present additives, according to the techniques known in the art. The mixing steps can be executed, for example, using an open mixer of open mixer type or an internal mixer of the type with tangential rotors (Banbury) or with interpenetrating rotors (Intermix), or in continuous mixers of Ko-Kneader type (Buss), or of the type with co-rotating or counter-rotating twin screw.

DRAWINGS

FIG. 1 shows a cross section view of a portion of a tyre.

DETAILED DESCRIPTION OF THE INVENTION

The present invention will be illustrated in further detail by means of an exemplifying embodiment with reference to the enclosed FIG. 1, where "a" indicates an axial direction and "r" indicates a radial direction. For the sake of simplicity, FIG. 1 only shows a part of the tyre, the remaining part not represented being identical and arranged symmetrically with respect to the radial direction "r".

With the reference number 100 in FIG. 1, a tyre for vehicle wheels is indicated which generally comprises a carcass structure 101 having respectively opposite end flaps engaged with respective anchoring annular structures 102, termed bead cores, possibly associated with a bead filler 104. The zone of the tyre comprising the bead core 102 and the filler 104 forms a bead structure 103 intended for anchoring the tyre on a corresponding mounting rim, not illustrated. Each bead structure 103 is associated with the carcass structure by means of backward folding of the opposite lateral edges of the at least one carcass layer 101 around the bead core 102 so as to form the so-called carcass backfolds 101*a* as illustrated in FIG. 1.

The carcass structure 101 is possibly associated with a belt structure 106 comprising one or more belt layers 106*a*, 106*b* situated in radial superimposition with respect to each other and with respect to the carcass structure 101, having typically metallic reinforcing cords. Such reinforcing cords can have cross orientation with respect to a circumferential extension direction of the tyre 100. By "circumferential" direction it is intended a direction generically directed according to the rotation direction of the tyre, or in any case tilted slightly with respect to the rotation direction of the tyre.

The belt structure 106 also comprises at least one reinforcing layer 106*c* that is radially external with respect to the belt layers 106*a*, 106*b*. The radially external reinforcing layer 106*c* comprises textile or metallic cords, arranged according to a substantially zero angle with respect to the circumferential extension direction of the tyre and immersed in the elastomeric material. Preferably, the cords are arranged substantially parallel and side-by-side to form a plurality of coils. Such coils are substantially oriented according to the circumferential direction (typically with an angle between 0° and 5°), such direction normally being termed "at zero degrees" with reference to its position with respect to the equatorial plane X-X of the tyre. By "equatorial plane" of the tyre it is intended a plane perpendicular to the rotation axis of the tyre and which divides the tyre into two symmetrically equal parts.

A tread band 109 made of vulcanised elastomeric compound, comprising at least one above-described iso-styrene/trans-butadiene/terpene random terpolymer, is applied in radially external position to the carcass structure 101 and/or if present (as in the illustrated case) to the belt structure 106.

In radially external position, the tread band 109 has a rolling portion 109*a* intended to come into contact with the ground. Circumferential grooves, which are connected by transverse notches (not represented in FIG. 1) so as to define a plurality of blocks of various shape and size distributed in the rolling portion 109*a*, are generally made in this portion 109*a*, which for the sake of simplicity in FIG. 1 is represented smooth.

In order to optimize the performances of the tread, the tread band can be made of a two-layer structure.

Such two-layer structure comprises the rolling portion or layer 109*a* (termed cap) and an under-layer 111 (termed base), attaining the so-called cap-and-base structure. It is thus possible to use an elastomeric material capable of providing a low rolling resistance for the cap 109*a* and simultaneously high resistance against wear and the formation of cracks while the elastomeric material of the underlayer 111 can be particularly aimed for low hysteresis in order to cooperate in limiting the rolling resistance. One or both layers of the cap-and-base structure can be made of an elastomeric material comprising at least one above-described iso-styrene/trans-butadiene/terpene random terpolymer. The under-layer 111 made of vulcanised elastomeric compound can be arranged between the belt structure 106 and the rolling portion 109*a*.

On the lateral surfaces of the carcass structure 101, respective sidewalls 108 made of vulcanised elastomeric compound—each extended from one of the lateral edges of the tread band 109 up to the respective bead structure 103—are also applied, in axially external position to said carcass structures 101.

A strip constituted by elastomeric compound 110, commonly known as "mini-sidewall", made of vulcanised elastomeric compound, may possibly be present in the zone of connection between the sidewalls 108 and the tread band 109, this mini-sidewall generally being obtained by means of co-extrusion with the tread band 109 and allowing an improvement of the mechanical interaction between the tread band 109 and the sidewalls 108. Preferably the end portion of the sidewall 108 directly covers the lateral edge of the tread band 109.

In several specific embodiments, such as that illustrated and described herein, the rigidity of the bead 103 can be improved by providing for a reinforcing layer 120 in the bead of the tyre, generally known as "flipper".

The flipper 120 is wound around the respective bead core 102 and the bead filler 104 so as to at least partially surround them. The flipper 120 is arranged between the carcass layer 101 and the bead structure 103. Usually, the flipper 120 is in contact with the carcass layer 101 and said bead structure 103. The flipper 120 typically comprises a plurality of metallic or textile cords incorporated in a cross-linked elastomeric material.

In several specific embodiments, such as that illustrated and described herein, the bead structure 103 can also comprise a further protection layer 121 that is generally known with the term "chafer", or protection strip, and which has the function of increasing rigidity and integrity of the bead structure 103.

The chafer 121 usually comprises a plurality of cords incorporated in a cross-linked elastomeric material; such cords are generally made of textile material (for example aramid or rayon), or of metallic material (for example steel cords).

Possibly, an anti-abrasive strip 105 made of an elastomeric material comprising at least one above-described iso-styrene/trans-butadiene/terpene random terpolymer is arranged so as to enclose the bead structure 103 along the axially internal and external zones and radially internal zone of the bead structure 103, thus being interposed between the latter and the rim of the wheel when the tyre 100 is mounted on the rim.

The Applicant in fact deems that the above-described iso-styrene/trans-butadiene/terpene random terpolymer can have advantageous application, beyond the tread, also in other components of the tyre.

A radially internal surface of the tyre 100 is also preferably internally covered with a layer of elastomeric material that is substantially impermeable to air, or so-called liner 112.

Preferably but not exclusively, the tyre 100 for automobiles is of HP (High Performance) or UHP (Ultra High Performance) type, i.e. it is a tyre capable of sustaining maximum speeds of at least 190 Km/h, up to over 300 Km/h. Examples of such tyres are those belonging to the classes "T", "U", "H", "V", "Z", "W", "Y".

According to a non-illustrated embodiment, the tyre can be a tyre for motorcycle wheels. The profile of the right section of the motorcycle tyre (not illustrated) has a high transverse curvature since it must ensure a sufficient footprint area in all motorcycle tilt conditions. The transverse curvature is defined by the value of the ratio between the distance f of the top of the tread from the line passing through the laterally opposite ends of the tread itself, measured on the equatorial plane of the tyre, and the width C defined by the distance between the laterally opposite ends of the tread itself. With tyre with high transverse curvature, it is indicated a tyre whose transverse curvature ratio (f/C) is at least 0.20.

The building of the tyre 100 as described above is actuated by means of assembly of respective semifinished products on a forming drum, not illustrated, by at least one assembly device.

On the forming drum, at least one part of the components intended to form the carcass structure 101 of the tyre 100 is built and/or assembled. More particularly, the forming drum is adapted to first receive the possible liner 112, and subsequently the carcass ply 101. Subsequently, non-illustrated devices coaxially engage, around each of the end flaps, one of the anchoring annular structures 102, they position an external sleeve comprising the belt structure 106 and the tread band 109 in a position coaxially centred around the cylindrical carcass sleeve and they shape the carcass sleeve according to a toroidal configuration by means of a radial expansion of the carcass ply 101, so as to determine the application thereof against a radially internal surface of the external sleeve.

Following building of the green tyre 100, a moulding and vulcanising treatment is executed aimed to determine the structural stabilisation of the tyre 100 by means of cross-linking of the elastomeric compounds, as well as to impart a desired tread design on the tread band 109 and to impart possible distinctive graphic marks at the sidewalls 108.

The present invention will be further illustrated hereinbelow by means of a certain number of preparation examples, which are provided for merely exemplifying purposes and without any limitation of the present invention.

EXAMPLES

Example 1—Preparation of the Polymers

All the reactions were executed under nitrogen, using the standard Schelnk or glove box techniques. Toluene, and the ocimene and styrene monomers, were acquired from Sigma Aldrich and distilled before use. The monomer 1,3-butadiene, acquired from Linde Gas Italy S.r.I., was dried through a column filled with activated silica and molecular sieves (3-4 Å) and it was slowly condensed in a Schlenk test tube containing toluene at 0° C.

Preparation of the Polybutadiene Homopolymer (Sample A)

In a flask with round bottom, the toluene and the m-MAO were introduced.

After 20 minutes, the catalyst 3 (FIG. 1) was dissolved in a portion of the toluene:m-MAO solution and mixed for 45 minutes.

In the meantime, the butadiene was added to the remaining toluene:m-MAO solution and mixed at room temperature for 30 minutes.

At this point, the two toluene:m-MAO solutions were mixed and the reaction mixture was heated at 30° C. for 62 hours. The polymerisation was terminated by adding ethanol and pouring a solution of acidified ethanol containing butylated hydroxytoluene (BHT). The precipitated polymer was recovered via filtration and dried under vacuum at 40° C.

Reaction conditions: 55 mL Toluene; 1.20 mol butadiene (533 mL of a solution in toluene containing 0.12 g/mL of butadiene; $2.7\times10^{-5}$ mol catalyst (18 mg), $1.6\times10^{-2}$ mol m-MAO (24 mL of a 7% by weight solution in heptane). Yield: 98% by weight.

Preparation of the Poly(Butadiene/Ocimene) Copolymer (Sample B)

In a flask with round bottom, the toluene and the m-MAO were introduced.

After 20 minutes, the catalyst 3 (FIG. 1) was dissolved in a portion of the toluene-m-MAO solution and mixed for 45 minutes.

In the meantime, the butadiene and the ocimene were added to the remaining toluene-m-MAO solution and mixed at room temperature for 30 minutes.

At this point, the two toluene:m-MAO solutions were mixed and the reaction mixture was heated at 30° C. for 62 hours. The polymerisation was terminated by adding ethanol and pouring a solution of acidified ethanol containing butylated hydroxytoluene (BHT). The precipitated polymer was recovered via filtration and dried under vacuum at 40° C.

Reaction conditions: 20 mL Toluene; 1.50 mol butadiene (593 mL of a solution in toluene containing 0.14 g/mL of butadiene; 1.50 mol ocimene (260 mL), $9.1\times10^{-5}$ mol catalyst (60 mg), $5.5\times10^{-2}$ mol m-MAO (82 mL of a 7% by weight solution in heptane). Yield: 23% by weight.

Preparation of the Poly(Butadiene/Styrene/Ocimene) Terpolymer (Sample C)

In a flask with round bottom, the toluene and the m-MAO were introduced. After 20 minutes, the catalyst 3 (FIG. 1) was dissolved in a portion of the toluene:m-MAO solution and mixed for 45 minutes.

In the meantime, the butadiene, the styrene and the ocimene were added to the remaining toluene:m-MAO solution and mixed at room temperature for 30 minutes.

At this point, the two toluene:m-MAO solutions were mixed and the reaction mixture was heated at 30° C. for 62 hours. The polymerisation was terminated by adding ethanol and pouring a solution of acidified ethanol containing butylated hydroxytoluene (BHT). The precipitated polymer was recovered via filtration and dried under vacuum at 40° C.

Reaction conditions: 55 mL Toluene; 0.92 mol butadiene (333 mL of a solution in toluene containing 0.15 g/mL of butadiene; 0.34 mol ocimene (57 mL), 0.44 mol styrene (51 mL), $5.4\times10^{-5}$ mol catalyst (36 mg), $3.2\times10^{-2}$ mol m-MAO (45 mL of a 7% by weight solution in heptane). Yield: 64% by weight.

Preparation of the Poly(Butadiene/Styrene) Copolymer (Sample D)

In a flask with round bottom, the toluene and the m-MAO were introduced. After 20 minutes, the catalyst 3 (FIG. 1) was dissolved in a portion of the toluene-m-MAO solution and mixed for 45 minutes.

In the meantime, the butadiene and the styrene were added to the remaining toluene-m-MAO solution and mixed at room temperature for 30 minutes.

At this point, the two toluene:m-MAO solutions were mixed and the reaction mixture was heated at 30° C. for 62 hours. The polymerisation was terminated by adding ethanol and pouring a solution of acidified ethanol containing butylated hydroxytoluene (BHT). The precipitated polymer was recovered via filtration and dried under vacuum at 40° C.

Reaction conditions: 20 mL Toluene; 1.50 mol butadiene (593 mL of a solution in toluene containing 0.14 g/mL of butadiene; 172 mL 1.50 mol styrene), $9.1\times10^{-5}$ mol catalyst (60 mg), $5.5\times10^{-2}$ mol m-MAO (82 mL of a 7% by weight solution in heptane). Yield: 23% by weight.

Example 2—Chemical-Physical Characteristics of the Polymers

The samples A, B, C and D prepared in example 1 were characterised by means of NMR spectroscopy and differential scanning calorimetry (DSC).

The NMR spectra were recorded on the Bruker Bruker AVANCE 400 (400 MHz spectrometer for $^{1}H$; 100 MHz for $^{13}C$) and on the Bruker ASCEND 600 spectrometer (600 MHz for $^{1}H$; 150 MHz for $^{13}C$). The NMR samples were prepared by dissolving about 10 mg of compounds in 0.5 mL of deuterated solvent.

The differential scanning calorimetry (DSC) measurements were made in nitrogen on a TA Instrument DSC Q20 calorimeter (heating and cooling speed of 10° C./min).

The mean molecular weights and the distribution of the molecular weights of the samples were determined with a GPC 150 C Waters GPC provided with a RI detector, a JASCO 875-UV (254 nm) detector and a set of four PSS columns (pore size of 106, 105, 104 and 103 Å, particle size of 5 μm). The carrier solvent used was tetrahydrofuran with a flow rate of 1.0 mL/min at 25° C. The calibration curve was established with commercial polystyrene standard.

The main characteristics of the samples have been summarised in the following Table 1, where Mw is the mean ponderal molecular weight, D is the dispersion index, Tg is the glass transition temperature. The polymer composition is expressed as percentage by weight with respect to the total weight of the polymer, B is butadiene, S is styrene and O is ocimene, where OT represents ocimene with 1,4-trans polymerisation, by means of the two conjugated double bonds, and $O^{V}$ represents ocimene with 1.2-vinyl polymerisation.

TABLE 1

| | | | | Polymer composition | | |
|---|---|---|---|---|---|---|
| Sample | Mw (kDa) | D | Tg (° C.) | B (1,4-trans) | S | O ($O^{T}/O^{V}$) |
| A | 226 | 2.0 | — | 100 (94) | — | — |
| B | 86 | 1.6 | −89.7 | 80 (94) | — | 20 (14/86) |
| C | 132 | 1.7 | −41.3 | 52 (95) | 42 | 6 (10/90) |
| D | 199 | 2.6 | −38.2 | 60 (95) | 40 | — |

Example 3

The elastomeric compositions 1-3 illustrated in the following Table 2 were prepared by using a styrene-indene resin (Novares TT30), and the samples C-D having the above-described characteristics.

All the components, except for sulphur and accelerant, were mixed together in an internal mixer (Pomini PL 1.6 model) for about 5 minutes (first step). As soon as the temperature reached 145+5° C., the elastomeric composition was unloaded. The sulphur and the accelerant were then added and the mixing was executed in an open roller mixer (second step). All the quantities are expressed in phr.

TABLE 2

| | 1* | $2^{i}$ | 3* |
|---|---|---|---|
| HP755B (TDAE) | 137.5 | 137.5 | 137.5 |
| Novares TL 90 | 5.0 | 5.0 | 5.0 |
| Novares TT30 | 10.00 | — | — |
| Sample C | — | 10.00 | — |
| Sample D | — | — | 10.00 |
| Silane JH75S | 2.8 | 2.8 | 2.8 |
| Stearic acid | 1.4 | 1.4 | 1.4 |
| ZnO | 2.1 | 2.1 | 2.1 |
| CRX 1391 CB | 60.00 | 60.00 | 60.00 |
| Vivatec ® 500 | 12.5 | 12.5 | 12.5 |
| 6PPD | 1.0 | 1.0 | 1.0 |

TABLE 2-continued

| | 1* | $2^{i}$ | 3* |
|---|---|---|---|
| TMQ | 1.0 | 1.0 | 1.0 |
| IB TUADS | 0.4 | 0.4 | 0.4 |
| CBS | 2.7 | 2.7 | 2.7 |
| Sulphur | 1.4 | 1.4 | 1.4 |

*comparison
$^{i}$invention

HP755B (TDAE): mixture of 100 parts by weight of styrene-butadiene rubber with 37.5 parts by weight of TDAE oil, comprising 39.6% by weight of styrene, 39.4% by weight of vinyl, produced by JSR Corporation, Japan Novares TL 90, coumarone resin, produced by RUTGERS GmbH, Germany Novares TT30: hydrocarbon resin produced by Reutgers Germany GmbH, Germany Silane JH75S: Mixture of Bis(triethoxysilylpropyl)tetrasulphide (50% TESPT) supported on carbon black (50%), produced by Evonik Industries AG, Germany CRX 1391 CB: carbon black produced by Cabot Corporation, USA Vivatec® 500: TDAE oil (Treated Distillate Aromatic Extract), produced by Hansen & Rosenthal, Germany 6PPD (antioxidant): N-(1,3-dimethylbutyl)-N'-phenyl-p-phenylene-diamine, produced by Eastman Chemical Company, USA TMQ: 2,2,4-Trimethyl-1,2-Dihydroquinoline produced by Synthos, Poland IB TUADS: Isobutyl thiuram disulphide, produced by R.T. Vanderbilt Holding Co., USA CBS: N-cyclohexyl-2-benzothiazylsulphenamide, produced by Lanxess Deutschland GmbH, Germany The characteristics of each elastomeric composition 1-3 were evaluated as described hereinbelow and the results were summarised in the following Table 3.

The hardness in IRHD degrees was measured according to the standard ISO 48:2007 on samples of the elastomeric compositions vulcanised at 170° C. for 10 minutes.

The static mechanical properties (load at 50%, 100%, and 300% of elongation, respectively termed CA05, CA1, CA3, breaking load and elongation at break) were measured according to the standard ISO 37:2005, on samples of the described elastomeric compositions that were previously cross-linked at 170° C. for 10 minutes.

The dynamic mechanical properties were measured with an Instron dynamic device in traction-compression mode according to the following methods. A sample of the cross-linked elastomeric composition (cross-linked at 170° C., for 10 min) having cylindrical shape (length=25 mm; diameter=12 mm), preloaded via compression up to 25% of longitudinal deformation with respect to the initial length, and maintained at the predetermined temperature (0° C., 23° C., 100° C.) for the entire duration of the test, was subjected to a dynamic sinusoidal elongation having a width of ±3.5% with respect to the length in pre-load conditions, with a frequency of 10 Hz. The dynamic mechanical properties are expressed in terms of dynamic elastic modulus (E') and loss factor values (Tan δ). The value Tan δ was calculated as the ratio between the viscous modulus (E") and the elastic modulus (E').

TABLE 3

| | 1* | 2[i] | 3* |
|---|---|---|---|
| IRHD 23° C. | 57.7 | 60.9 | 59.7 |
| Ca 0.5 [MPa] | 0.78 | 0.89 | 0.84 |
| Ca 1 [MPa] | 1.29 | 1.48 | 1.12 |
| Ca 3 [MPa] | 6.36 | 7.78 | 7.24 |
| Breaking load [MPa] | 14.33 | 18.04 | 17.27 |
| Elongation at break [%] | 565.0 | 576.8 | 579.6 |
| E'[MPa] 0° C. 10 Hz [MPa] | 9.36 | 9.80 | 9.13 |
| E'[MPa] 23° C. 10 Hz [MPa] | 7.21 | 8.13 | 7.86 |
| E'[MPa] 100° C. 10 Hz [MPa] | 3.30 | 3.87 | 3.70 |
| Tan δ 0° C. 10 Hz | 0.851 | 0.765 | 0.738 |
| Tan δ 23° C. 10 Hz | 0.653 | 0.613 | 0.600 |
| Tan δ 100° C. 10 Hz | 0.203 | 0.202 | 0.196 |

*comparison
[i]invention

The obtained results demonstrated that:

The static mechanical properties of the compound 2 of the invention (load at 50%, 100%, 300% of elongation, breaking load and elongation at break) are improved with respect to those of the reference 1 (compound of normal production) and even better than that of the reference 3 (compound according to EP2643367 B1);

the value of modulus E' of the compound 2 of the invention is constantly higher than the value obtained with the reference compound 3 (compound according to EP2643367 B1) and, simultaneously, the Tan delta (hysteresis) values at 100° C. are more similar to those obtained with the reference compound 1 (compound of normal production), obtaining that desired, i.e. improving the balance between breaking properties and hysteresis profile, and in particular in this case maintaining the hysteresis profile and improving the breaking properties.

The results obtained have demonstrated that a tyre tread according to the present invention simultaneously had greater rigidity and mechanical strength accompanied by improved performances in case of severe use.

Example 4

The elastomeric compositions 4-6 illustrated in the following Table 4 were prepared by using a styrene-alkylstyrene resin (Kristalex F-85), and the samples C-D having the above-described characteristics.

All the components, except for sulphur and accelerant, were mixed together in an internal mixer (Pomini PL 1.6 model) for about 5 minutes (first step). As soon as the temperature reached 145+5° C., the elastomeric composition was unloaded. The sulphur and the accelerant were then added and the mixing was executed in an open roller mixer (second step). All the quantities were expressed in phr.

TABLE 4

| | 4* | 5[i] | 6* |
|---|---|---|---|
| SIR 20 P 91 | 12.5 | 12.5 | 12.5 |
| BUNA CB 25 | 15 | 15 | 15 |
| NS 522 | 99.7 | 99.7 | 99.7 |
| SI 69 | 7.0 | 7.0 | 7.0 |
| Zeosil 1165 MP | 87.5 | 87.5 | 87.5 |
| Kristalex F-85 | 12.00 | — | — |
| Sample C | — | 12.00 | — |
| Sample D | — | — | 12.00 |
| Stearic acid | 2.0 | 2.0 | 2.0 |
| Vivatec ® 500 | 10.0 | 10.0 | 10.0 |
| Zinc octoate | 2.5 | 2.5 | 2.5 |
| Riowax BN01 | 2.0 | 2.0 | 2.0 |
| CRX 1391 CB | 5.0 | 5.0 | 5.0 |
| 6PPD | 3.5 | 3.5 | 3.5 |
| TMQ | 1.8 | 1.8 | 1.8 |
| IB TUADS | 0.5 | 0.5 | 0.5 |
| TBBS | 2.0 | 2.0 | 2.0 |
| PVI | 0.3 | 0.3 | 0.3 |
| Sulphur | 1.2 | 1.2 | 1.2 |

*comparison
[i]invention

SIR 20 P 91: natural rubber, produced by ANEKA BUMI PRATAMA, SED, Indonesia

BUNA CB 25: cis-1,4-polybutadiene rubber, produced by Lanxess

NS 522: styrene-butadiene rubber, produced by Zeon

SI 69: bis(3-triethoxysilylpropyl) tetrasulphide, produced by Degussa-Hüls

Zeosil 1165 MP: precipitated silica, produced by Rhone-Poulenc

Kristalex F-85: hydrocarbon resin produced by Eastman Chemical Co, USA

Vivatec® 500 (plasticising agent): TDAE (Treated Distilate Aromatic Extract) oil, produced by Hansen & Rosenthal, Germany Riowax BN01: paraffin wax, produced by SER S.p.A.

CRX 1391 CB: carbon black produced by Cabot Corporation, USA

6PPD (antioxidant): N-(1,3-dimethylbutyl)-N'-phenyl-p-phenylene-diamine, produced by Eastman Chemical Company, USA TMQ: 2,2,4-Trimethyl-1,2-Dihydroquinoline, produced by Synthos, Poland IB TUADS: Isobutyl thiuram disulphide, produced by R.T. Vanderbilt TBBS: N-tert-butyl-2-benzothiazole sulphenamide produced by Rhein Chemie GmbH PVI: N-cyclohexylthiophthalimide, produced by Brenntag Spa, Milano The characteristics of each elastomeric composition 4-6 were evaluated as described for example 3 and the results were summarised in the following Table 5.

TABLE 5

| | 4* | 5[i] | 6* |
|---|---|---|---|
| IRHD 23° C. | 75.1 | 73.2 | 75.6 |
| Ca 0.5 [MPa] | 1.37 | 1.32 | 1.42 |
| Ca 1 [MPa] | 2.35 | 2.15 | 2.36 |
| Ca 3 [MPa] | 10.43 | 9.28 | 10.32 |
| Breaking load [MPa] | 17.77 | 19.25 | 19.44 |
| Elongation at break [%] | 500.8 | 564.8 | 528.7 |
| E'[MPa] 0° C. 10 Hz [MPa] | 9.26 | 10.00 | 10.02 |
| E'[MPa] 23° C. 10 Hz [MPa] | 9.15 | 9.93 | 10.11 |
| E'[MPa] 100° C. 10 Hz [MPa] | 5.42 | 5.85 | 6.22 |
| Tan δ 0° C. 10 Hz | 0.480 | 0.427 | 0.410 |
| Tan δ 23° C. 10 Hz | 0.403 | 0.361 | 0.350 |
| Tan δ 100° C. 10 Hz | 0.107 | 0.125 | 0.120 |

*comparison
[i]invention

The obtained results demonstrated that:

The breaking load and the elongation at break of the compound 5 of the invention is improved with respect to those of the reference 4 (compound of normal production) and even better (in elongation) than that of reference 6 (compound according to EP2643367 B1);

the value of modulus E' of the compound 5 of the invention is constantly higher than the value obtained with the reference compound 4 and comparable to that of the compound 6 (compound according to EP2643367 B1) and, simultaneously, the values of Tan δ (hysteresis) at all temperatures are higher than those obtained with the compound 6 (compound according to EP2643367 B1), while the value of Tan δ at 100° C. is also higher than the reference compound 4 (compound of normal production).

The hysteresis at 100° C. is considered predictive of the high grip in high use conditions: obtaining an increase of such value with respect to the known compounds or maintaining the breaking properties is an unexpected and surprising result, of particular interest.

The results obtained have demonstrated that a tyre tread according to the present invention simultaneously had greater mechanical strength, increasing the resistance to breaking/tearing, accompanied by improved performances in case of severe use, improving the grip at all operating temperatures with respect to the preceding finding (EP2643367 B1).

Example 5

The elastomeric compositions 7-9 illustrated in the following Table 6 were prepared by using an elastomeric composition of normal production and the samples A-B having the above-described characteristics.

All the components, except for sulphur and accelerant, were mixed together in an internal mixer with T set at 130° C. (Brabender®) for about 5 minutes (first step). The sulphur and the accelerant were then added in a second step and the compound was unloaded after a further two minutes. The composites were finally further homogenized by passing them through an open roller mixer 5 times. All the quantities are expressed in phr.

TABLE 6

| | 7ʳ | 8* | 9* |
|---|---|---|---|
| SSBR | 100 | 100 | 100 |
| BR HIGH CIS | 30 | 20 | 20 |
| Sample A | — | 10 | — |
| Sample B | — | — | 10 |
| Vivatec ® 500 | 10 | 13 | 13 |
| Zeosil 1165 MP | 70 | 70 | 70 |
| Stearic acid | 2.0 | 2.0 | 2.0 |
| Silane JH75S | 6 | 6 | 6 |
| Kristalex F-85 | 10.0 | 10.0 | 10.0 |
| 6PPD | 3.0 | 3.0 | 3.0 |
| TBBS | 3.0 | 3.0 | 3.0 |
| Sulphur | 1.0 | 1.0 | 1.0 |

ʳreference
*comparison

SSBR: styrene-butadiene rubber, NS 522 produced by Zeon Co., Japan

BR HIGH CIS: cis-1,4-polybutadiene rubber, BUNA CB25, produced by Versalis S.p.A., Italy Vivatec® 500: TDAE oil (Treated Distillate Aromatic Extract), produced by Hansen & Rosenthal, Germany Zeosil 1165 MP: precipitated silica, produced by Rhone-Poulenc, France Silane JH75S: Mixture of Bis(triethoxysilylpropyl)tetrasulphide (TESPT 50%) supported on carbon black (50%), produced by Evonik Industries AG, Germany 6PPD: N-(1,3-dimethylbutyl)-N'-phenyl-p-phenylene-diamine, produced by Eastman Chemical Co., USA Kristalex F-85: hydrocarbon resin produced by Eastman Chemical Co, USA TBBS: N-tert-butyl-2-benzothiazole sulphenamide produced by Rhein Chemie GmbH, Germany The static mechanical properties (load at 50%, 100%, and 300% of elongation, respectively termed CA05, CA1, CA3, breaking load and elongation at break) of each elastomeric composition 7-9 were evaluated as described for example 3 and the results were summarised in the following Table 7.

TABLE 7

| | 7ʳ | 8* | 9* |
|---|---|---|---|
| Ca 0.5 [MPa] | 1.05 | 1.23 | 1.07 |
| Ca 1 [MPa] | 1.58 | 1.84 | 1.68 |
| Ca 3 [MPa] | 5.92 | 5.73 | 6.15 |
| Breaking load [MPa] | 21.76 | 19.37 | 17.81 |
| Elongation at break [%] | 712.02 | 706.55 | 644.93 |

ʳreference
*comparison

The obtained results were disappointing for both of the tested polymers based on the trans polybutadiene. The substitution of the commercial high cis butadiene, used in compound 7, with the corresponding trans polymer (compound 8), or with the trans butadiene-ocimene copolymer (compound 9), usually results in more rigid compounds, notwithstanding the addition of a slightly higher amount of TDAE oil, and with worsened breaking behaviour, particularly negative with compound 9, comprising the trans butadiene-ocimene copolymer.

The invention claimed is:

1. A tyre for vehicle wheels comprising:

a carcass structure, having opposite lateral edges associated with respective bead structures;

optionally, a belt structure applied in a radially external position with respect to the carcass structure;

a tread band applied in a radially external position with respect to the carcass and/or belt structure;

wherein the tread band comprises a cross-linked elastomeric material copmprising, before cross-linking, a cross-linkable elastomeric composition, wherein the elastomeric composition comprises at least one iso-styrene/trans-butadiene/terpene random terpolymer, the iso-styrene/trans-butadiene/terpene random terpolymer having a styrene content ranging from 30% to 70% by weight with respect to the total weight of terpolymer, a terpene content ranging from 1% to 15% by weight with respect to the total weight of terpolymer, and a content of 1,4-butadiene ranging from 30% to 70% by weight with respect to the total weight of terpolymer.

2. The tyre for vehicle wheels according to claim 1, wherein the iso-styrene/trans-butadiene/terpene random terpolymer has a styrene content ranging from 40% to 60% by weight with respect to the total weight of terpolymer.

3. The tyre for vehicle wheels according to claim 1, wherein the iso-styrene/trans-butadiene/terpene random terpolymer has a content of 1,4-butadiene ranging from 40% to 60%, by weight with respect to the total weight of terpolymer.

4. The tyre for vehicle wheels according to claim 1, wherein the iso-styrene/trans-butadiene/terpene random terpolymer has a terpene content ranging from 5% to 15%, by weight with respect to the total weight of terpolymer.

5. The tyre for vehicle wheels according to claim 1, wherein the iso-styrene/trans-butadiene/terpene random terpolymer has a value of Tg, measured at the onset, ranging from −45° C. to +20° C.

6. The tyre for vehicle wheels according to claim 1, wherein the iso-styrene/trans-butadiene/terpene random terpolymer has a molecular weight lower than 500,000.

7. The tyre for vehicle wheels according to claim 1, wherein the iso-styrene/trans-butadiene/terpene random terpolymer molecular weight dispersion index ID is ranging from 1 to 5.

8. The tyre for vehicle wheels according to claim 1, wherein the iso-styrene/trans-butadiene/terpene random terpolymer comprises a terpene selected from the group consisting of myrcene, ocimene, farnesene, geraniol, linalool, limonene, pinene, sabinene, terpinene, farnesol, and nerolidol.

9. The tyre for vehicle wheels according to claim 8, wherein the iso-styrene/trans-butadiene/terpene random terpolymer comprises a terpene selected from the group consisting of myrcene, ocimene and farnesene.

10. The tyre for vehicle wheels according to claim 9, wherein the iso-styrene/trans-butadiene/terpene random terpolymer comprises terpene in vinyl conformation in an amount greater than 75% by weight, with respect to the total weight of terpene contained in the iso-styrene/trans-butadiene/terpene random terpolymer.

11. The tyre for vehicle wheels according to claim 9, wherein the iso-styrene/trans-butadiene/terpene random terpolymer comprises terpene in trans conformation in an amount lower than 25% by weight, with respect to the total weight of terpene contained in the iso-styrene/trans-butadiene/terpene random terpolymer.

12. The tyre for vehicle wheels according to claim 1, wherein the iso-styrene/trans-butadiene/terpene random terpolymer is present in the elastomeric composition in an amount ranging from 1 phr to 30 phr.

13. The tyre for vehicle wheels according to claim 1, wherein the iso-styrene/trans-butadiene/terpene random terpolymer is through copolymerisation of styrene, butadiene and terpene, using a homogenous catalyst having general formula (I)

(I)

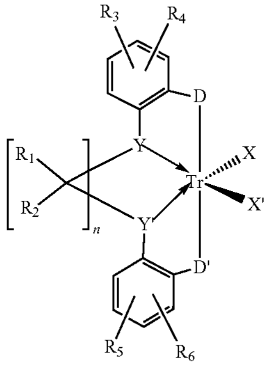

wherein Tr is a transition metal,

X and X', equal to or different from each other, are a halogen atom,

R1 and R2, equal to or different from each other, are a hydrogen atom or a linear or branched alkyl group having from 1 to 10 carbon atoms, R3 to R6, equal to or different from each other, are a hydrogen atom or a linear or branched alkyl group having from 1 to 10 carbon atoms, or a linear or branched aryl alkyl group having from 7 to 14 carbon atoms, Y to Y', equal to or different from each other, are an atom of oxygen, sulphur, selenium, tellurium, or an NR7 or PR7 group, D and D', equal to or different from each other, are an atom of oxygen, sulphur, selenium, tellurium, or an NR7 or PR7 group, R7 is a hydrogen atom or a linear or branched alkyl group having from 1 to 10 carbon atoms, n is an integer from 1 to 10.

14. The tyre for vehicle wheels according to claim 1, wherein the cross-linkable elastomeric composition comprises at least one natural or synthetic diene elastomeric polymer with high molecular weight.

* * * * *